United States Patent
Ernst et al.

[15] 3,680,944
[45] Aug. 1, 1972

[54] HOLOGRAPHIC APPARATUS UTILIZING A PULSED LASER

[72] Inventors: Charles H. Ernst, Manhattan Beach; Martin Dean Cawley, Redondo Beach, both of Calif.

[73] Assignee: TRW, Inc., Redondo Beach, Calif.

[22] Filed: Nov. 21, 1968

[21] Appl. No.: 777,852

[52] U.S. Cl. ...................350/3.5, 350/169, 350/188
[51] Int. Cl. ...............................................G02b 27/22
[58] Field of Search ...............350/3.5, 169; 331/94.5

[56] References Cited

OTHER PUBLICATIONS

McClung et al., IEEE Journal of Quantum Electronics, pp. 94– 99 (5/1965).
Jacobson et al., Applied Optics, Vol. 4 No. 11, pp. 1509– 1510 (11/1965).
Konstantinov et al., Soviet Physics-Technical Physics, Vol. 11 No. 9, pp. 1279– 1281 (3/1967).
Brooks et al., IEEE Journal of Quantum Electronics, Vol. QE-2, No. 8, pp. 275– 279 (8/1966).

*Primary Examiner*—David Schonberg
*Assistant Examiner*—Robert L. Sherman
*Attorney*—Daniel T. Anderson, Gerald Singer and Alfons Valukonis

[57] ABSTRACT

A holographic apparatus capable of utilizing a pulsed laser developing an incompletely coherent light beam for taking holograms, particularly in reflection. The apparatus makes use of a diffuser which is preferably inserted into the unenlarged laser beam for averaging amplitude and phase variations and for scattering the light of the scene beam so that there will be at least a component or portion of the scene beam capable of interfering with a component of the reference beam at each point of the hologram. The pulsed ruby laser may be improved by providing at least one mode selector in the resonant cavity which encloses the ruby rod. This mode selector may, for example, consist of a suitable dye which normally absorbs the light of the laser and becomes transparent when the light intensity exceeds a predetermined amount. Alternatively or in addition a second mode selector may be used which may consist of a resonant reflector such as a Fabry-Perot etalon. The holographic apparatus may be further simplified by utilizing a single lens for reflecting the light of a laser to form a reference beam, while the transmitted light forming the scene beam is diffused by making the opposed surface of the lens into a light diffuser.

6 Claims, 7 Drawing Figures

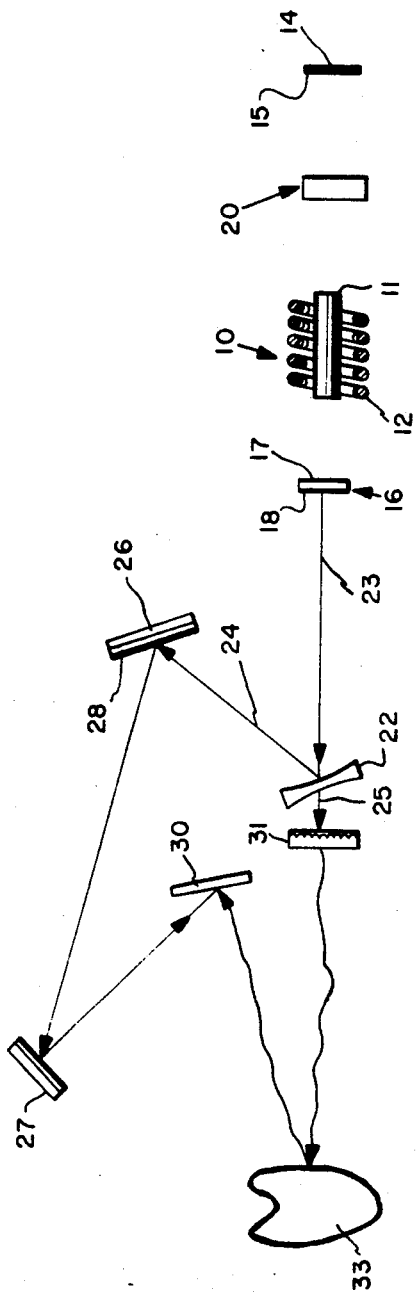
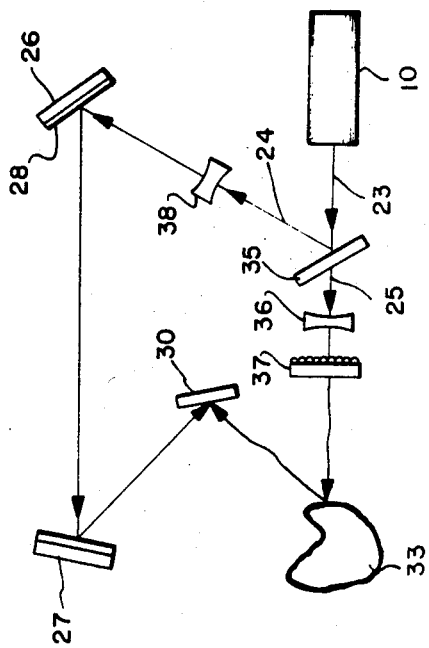
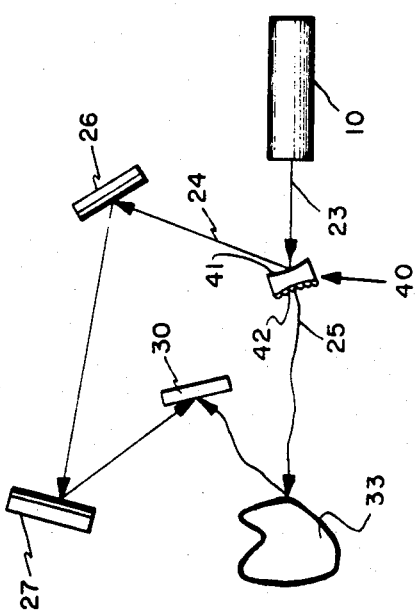
Fig.1
Fig.2
Fig.3
Charles H. Ernst
Martin D. Cawley
INVENTORS
BY
ATTORNEY

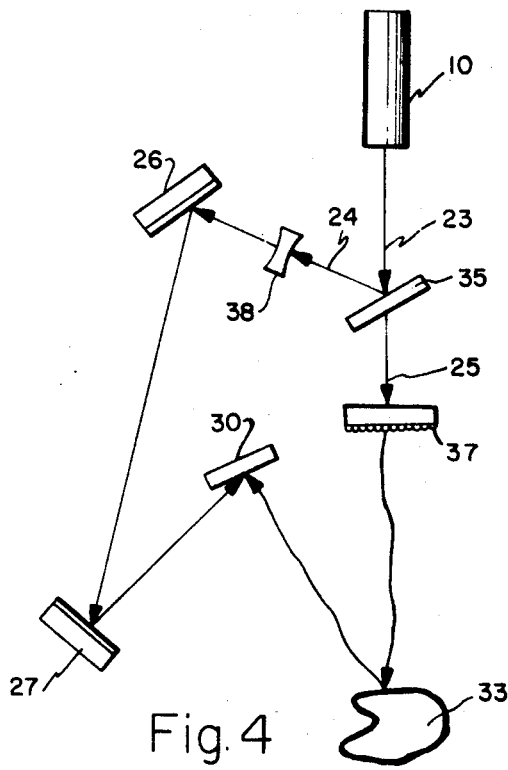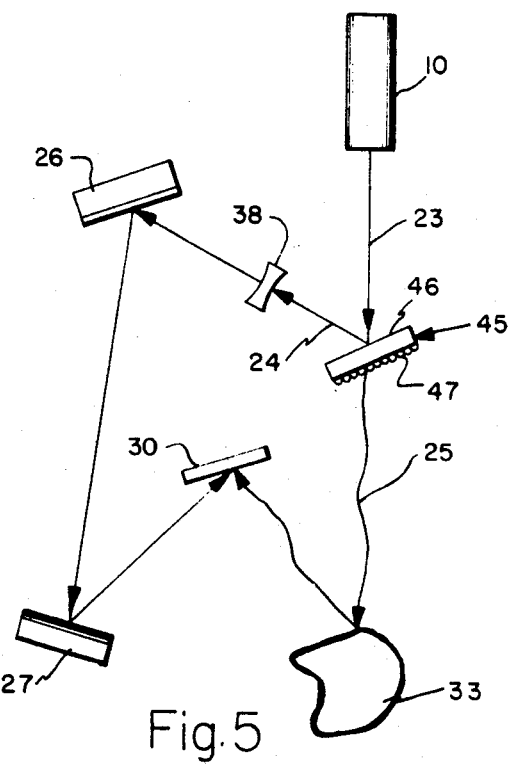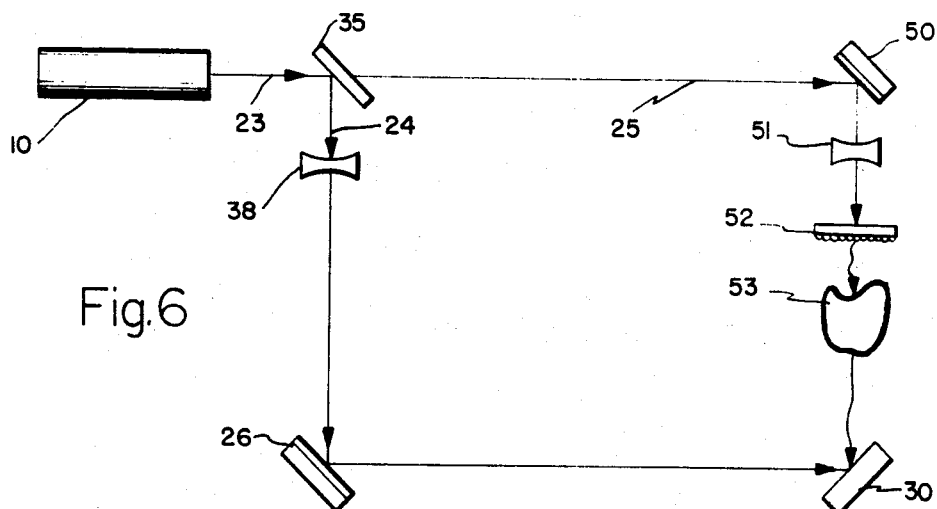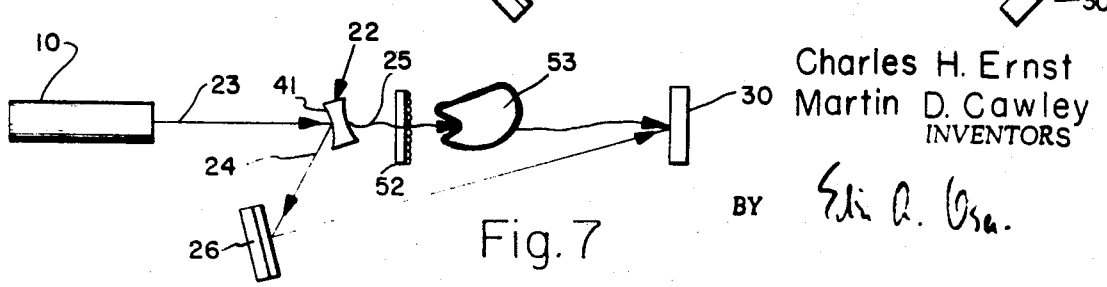

HOLOGRAPHIC APPARATUS UTILIZING A PULSED LASER

BACKGROUND OF THE INVENTION

This invention relates generally to holography and particularly relates to a holographic apparatus providing improved spatial coherence, improved amplitude distribution and permits to take holograms in reflection.

In order to obtain good holograms either of action scenes or to obtain holograms of a subject by reflected light it is necessary to have a very high light intensity. Unfortunately at this time gas lasers do not develop a light beam with the necessary intensity. On the other hand, the light beam from a gas laser has excellent coherence, both spatial and temporal. Nevertheless, due to the relatively low intensity of a gas laser, exposure times are on the order of seconds. During this time the entire equipment must be maintained vibration-free within approximately one-tenth of a wave length. The temporal coherence of a laser has to do with the path length of the two beams which are made to interfere with each other. This can generally be obtained by careful matching of the path length of the reference and scene beams. On the other hand, spatial coherence has to do with the coherence across a cross-section of the light beam and is more difficult to obtain.

On the other hand, a light beam from a solid laser generally has much higher light intensity. This is particularly true of a pulsed laser, an example of which is a ruby laser. Since the power is only generated during a short fraction of the time, which may be as short as milliseconds to nanoseconds, the solid material and other elements of the laser are capable of withstanding the high light intensity and temperatures encountered. Accordingly solid state lasers and particularly pulsed lasers such as ruby lasers are ideally suited for holography. Since a pulsed laser generates a very intense light beam for only a very short period of time, for example 100 nanoseconds, it is particularly suitable for taking action pictures of phenomena which change rapidly with time.

However, on the other hand, coherence of the light beam particularly of a pulsed ruby laser is not as good as required to obtain high-quality holograms, particularly in reflection. It is known, for example, that the cross-section of the light beam obtained from a ruby laser is of non-uniform intensity distribution. This non-uniform light intensity across the cross-section of the light beam furthermore varies as a function of time. It is believed that this is due to the fact that individual filaments of the ruby rod lase independently of each other. Thus, one filament may start to lase before another filament does. Or else one filament may decay before the others do. The result is that the light intensity is not uniform and continuously varies across the cross-section of the laser.

It is believed at this time that this is due to non-uniformities of the ruby crystal. These non-uniformities or defects cause variations of various physical constants such as the index of refraction and the like.

For this and other reasons it has been found to be extremely difficult to obtain holograms, particularly of extended objects where the hologram is made by reflecting the light beam from the object. One of the reasons is that coherence of the laser is insufficient to permit interference patterns between a scattered scene beam and the reference beam which may have considerably different light paths.

It has been proposed by L. D. Siebert in a publication in proceedings of the IEEE of July 1968, pages 1,242 to 1243, that a ruby laser may be used with a two-stage ruby amplifier for obtaining holograms of a front lighted non-stationary scene. Such an arrangement however requires a very expensive ruby rod of the best obtainable quality and one or more special mode selectors. As a result, the price of such a laser and amplifier is many times that of a conventional laser.

It is accordingly an object of the present invention to provide a holographic apparatus which permits to take holograms of action scenes of holograms by reflected light which neither requires a perfectly coherent laser, nor a ruby laser with special mode selector and special ruby amplifiers.

Another object of the present invention is to provide a holographic apparatus having means for substantially improving the spatial coherence and the amplitude distribution of a light beam, thereby permitting holography with a high-power, low-coherence, inexpensive laser.

A further object of the present invention is to provide a simplified holographic apparatus where the functions of a beam splitter, a diverging lens and a diffuser are combined in a single, inexpensive element.

Still another object of the present invention is to provide a holographic apparatus including a relatively inexpensive, pulsed, solid-state laser having a narrow frequency band obtained by using a mode selector and additional means, including a light diffuser for improved both the spatial coherence of the laser beam and its amplitude distribution.

SUMMARY OF THE INVENTION

In accordance with the present invention there is provided holographic apparatus for providing a light beam having improved spatial coherence and more uniform amplitude distribution. This apparatus includes a laser having a solid laserable material and means for pumping it into an excited state. A resonant cavity encloses the laserable material to cause generation of a pulse of a substantially monochromatic light beam. Included in the cavity may be a mode selector which permits a light pulse of substantially a single frequency to be built up.

The holographic apparatus further includes optical means such as a beam splitter for splitting the light beam into the usual scene beam and reference beam. A recording material such, for example, as a photographic plate or film is disposed in a predetermined plane for recording a hologram of an object to be recorded. Means are provided such as a mirror or the like for reflecting the reference beam onto the recording beam. Finally a light diffuser is interposed into the path of the scene beam. Accordingly an object in the path of the scene beam reflects and diffuses the scene beam onto the recording material. The object accordingly may operate as an additional light diffuser.

The light diffuser and the reflecting object jointly in this case average out variations of light intensity across the light beam. Additionally they make it possible to permit interference of light of at least one component or portion of the scene beam with a component of the reference beam at every point of the hologram.

This is made possible because it is well known that a hologram is very insensitive to background illumination. For example, the intensity of the incoherent background when making a hologram may be anywhere from 10 to 100 times as large as the coherent light intensity needed to make the hologram by itself. Accordingly if, say 1 to 10 percent of the light of the light beam is coherent and of uniform amplitude, it is feasible to obtain a hologram even though the ruby rod of the laser is not of the highest quality.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 1 is a schematic representation of a holographic apparatus in accordance with the present invention, including a solid laser having two mode selectors, a diverging lens for the reference beam and a diffuser for the scene beam for obtaining a hologram in reflected light;

FIG. 2 is a schematic showing of an alternative embodiment of the invention including a separate diverging lens in the path of the reference beam and an additional diverging lens and diffuser in the path of the scene beam;

FIG. 3 is a schematic representation of another embodiment of the invention using a common element serving as a diverging lens for the reference beam, a beam splitter and a diffuser for the scene beam;

FIG. 4 is another schematic representation of a modified holographic apparatus for taking holograms in reflected light featuring a diverging lens in the path of the reference beam and a light diffuser in the path of the unenlarged scene beam;

FIG. 5 is a schematic representation of still another holographic apparatus for taking holograms in reflected light which differs from that of FIG. 4 by providing a combination beam splitter and light diffuser in the path of the scene beam;

FIG. 6 is a schematic representation of a holographic arrangement for taking a hologram of an object in transmission and including a diverging lens in the path of both reference and scene beams and a light diffuser in the path of the scene beam; and FIG. 7 is a schematic representation of a simplified holographic arrangement for taking a hologram in transmission of an object and featuring a single element serving as a diverging lens, beam splitter and diffuser.

DESCRIPTION OF THE PREFERRED EMBODIMENTS

Referring now to the drawings, wherein like elements are designated by the same reference characters, and particularly to FIG. 1 there is illustrated a holographic arrangement in accordance with the present invention. The apparatus of FIG. 1 includes a laser 10. The laser 10 may include, for example, a solid rod 11 of a laserable material such, for example, as a ruby rod. Surrounding the ruby rod 11 is a flashlamp 12 which may, for example, have a few helical turns about the ruby rod 11 and which serves the purpose to pump the atoms or molecules of the laserable material into an upper excited level. A resonant cavity surrounding the ruby rod 11 is formed by a mirror 14 which may, for example, be totally reflecting and which may have a reflecting front surface 15 facing the ruby rod 11.

There is further provided a second reflector 16 which is only partly reflecting and which preferably is a resonant reflector. Thus, the reflector 16 may have reflecting surfaces 17 and 18 as shown on opposite sides. This may conveniently consist of a Fabry-Perot etalon with two or more spaced, reflecting surfaces. Such resonant reflectors are conventional and well-known in the art. They can be made in such a manner that they operate as a mode selector or frequency filter with reflectance rapidly varying, or changing considerably with a wavelength change on the order of one-twentieth of an Angstrom unit (AU).

A second mode selector 20 may optionally also be disposed in a resonant cavity formed by the reflectors 14 and 16. The second mode selector 20 may be a cell with transparent walls for containing a suitable dye. This dye should be normally opaque to the light of the laser. For example, a ruby laser develops a light beam at a wave-length of 6,943 AU. Furthermore the dye should be in the nature of a photochromic material, that is, it should bleach or become transparent when the light intensity exceeds a certain value. Such dyes change states extremely fast and will switch or change from the opaque to the transparent state in a period on the order of $10^{-12}$ seconds. Such a dye is obtainable from Eastman Kodak under the name of cryptocyanine. The dye has a molecular weight of approximately 480.39 and has the following formula:

This dye may be dissolved in various chemicals such as methanol ($CH_3OH$), ethanol ($C_2H_5OH$) or acetonitrile ($CH_3CH$). However it should be pointed out that such dyes and their composition are well-known in the art and their operation as mode selectors is well understood.

It has been found that superior holograms are obtainable with a laser of the type shown in FIG. 1 at 10 including two mode selectors 16 and 20. However either the mode selector 20 consisting of a fast bleaching dye or the mode selector 16 consisting of a resonant reflector of the Fabry-Perot type could be omitted and acceptable holograms in reflection are obtainable by means of such a laser. It is still possible to obtain holograms by omitting both mode selectors but their quality is inferior.

It may be mentioned in passing that the ruby rod 11 is of the quality called "select interference quality." It will be understood that this is not the best obtainable quality and hence, that the ruby rod 11 is relatively inexpensive. The distance between the two reflectors 14 and 16 may be on the order of 1.5 meters. The ruby rod itself may be one-half inch by 3¾ inches.

However in spite of the provision of one or two mode selectors, the laser 10 does not produce completely coherent light. Apparently only a fraction of the light which is obtained from the laser is capable of interfering with another fraction of the light of the same beam. Furthermore it is well known as pointed out previously that a cross-section of the beam obtainable from such a laser has phase and amplitude variations across the beam which may be due to imperfections of the crystal. It should be clearly stated at this time that the precise operation of a laser at this time is not known and that any theories advanced herein concerning the holographic apparatus of the invention are only tentative. While the superior results have been obtained with each embodiment shown in the drawings, a complete theory explaining all observable facts is not available at present.

Turning now to the holographic apparatus proper this includes a diverging lens 22, sometimes called a negative lens. The embodiment shown in FIG. 1 is a lens which may have two concave surfaces as shown and additionally operates as a beam splitter. A portion of the initial laser beam 23 is split into a reflected reference beam 24 and a transmitted scene beam 25. The reflected reference beam 24 is increased in diameter due to the action of the diverging lens 22. However if the reference beam 24 is reflected from a convex surface it will also be enlarged. The reference light beam 24 is then reflected twice by a pair of mirrors 26, 27. These mirrors preferably are front reflecting mirrors, that is, the surface 28, for example, of the mirror 26 is the one which reflects the beam, thereby avoiding any problems which may occur due to a second reflection of the light beam at the surface of a second surface mirror.

The reference beam 24 which has been twice reflected by the end reflectors 26 and 27 then impinges on a recording material 30 for recording the hologram. This may be any suitable material such, for example, as a photographic plate or film or else a suitable photochromic material.

The scene beam 25 is scattered by a light diffuser 31 following the element 22. The light diffuser 31 preferably is interposed into the unenlarged scene beam although the lens 22 tends to enlarge the scene beam. The diffused scene beam which emerges from the diffuser 31 is then permitted to be reflected from the object 33 and impinges on the hologram 30.

It has been found to be essential to the operation of the holographic apparatus of the invention to use a light diffuser such as shown at 31. The complete action and operation of such a light diffuser is not completely understood. However the following theories are tentatively given at this time. In the first place, the light diffuser 31 preferably interposed into the path of the unenlarged scene beam serves the purpose of mixing or averaging the amplitude of the light of the laser beam. This tends to average out variations of the light intensity across the beam which normally exist with the type of laser described herein.

It is believed that this also tends to substantially minimize or eliminate the effects of interference of different light beams of slightly different frequency with each other. This shows up on many holograms as dark areas or streaks, sometimes referred to as "worms." These are believed due to the fact that adjacent bundles of light may have slightly different frequencies and hence, tend to interfere with each other to create light and dark areas in space which eventually are recorded on the hologram. The effects of such slight frequency variations are again averaged by the use of a light diffuser. Thus the light diffuser permits interference of adjacent light beams with slightly different path lengths to average out variations of light intensity due to interference or diffraction phenomena. This may be considered to be an averaging of differences of phases and amplitudes of adjacent bundles of light.

Finally there is believed to be a through mixing of the adjacent light bundle of the laser beam. This, coupled with the fact that the light is again scattered by the object 33, permits interference of light of at least one component or portion of the scene beam with at least a coherent component or portion of the reference beam at every point of the hologram. This is true regardless of whether all the light from the laser is in spatial coherence or not. All that needs to be assumed is that a fraction, which may be a small as 1%, of the light is in true coherence. However it should be emphasized again that a complete theory explaining all observed facts cannot be offered at this time.

Holograms have been recorded on 8E75 photographic plates which are high-resolution-Scientia emulsion for laser photography obtainable in the trade from Agfa-Gevaert, Inc.

It should be noted that no attempt has been made in the drawings to show that the path length of the reference beam 24 is made to equal that of the scene beam 25.

FIG. 2 illustrates a holographic apparatus generally similar to that of FIG. 1. The laser 10 may be the same as that disclosed in connection with FIG. 1. However in FIG. 2 there is illustrated as a separate element a beam splitter 35 for splitting the laser beam into a reference beam 24 and a scene beam 25. A diverging lens 36 followed by a light diffuser 37 are interposed into the path of the scene beam between the beam splitter 35 and the object 33. Also a diverging lens 38 is interposed into the path of the reference beam 24 between the beam splitter 35 and the reflector 28. Otherwise the arrangement of FIG. 2 is the same as that of FIG. 1 and operates in the same manner. It should be noted that in the embodiment of FIG. 2 the light diffuser 37 is not interposed into the unenlarged beam but into the enlarged laser beam due to the action of the diverging lens 36.

The embodiment of the invention of FIG. 3 to which reference is now made is characterized by a minimum of optical components. Thus the optical element 40 serves simultaneously as a beam splitter, a diverging lens and a light diffuser. To this end the optical element 40 may, for example, consist as illustrated of a diverging lens having two opposed concave surfaces. The front surface 41 which is the surface facing the laser beam 23 operates simultaneously as a beam splitter to reflect a portion of the original laser beam to provide the reference beam 24, and as a diverging lens. As mentioned before, the front surface 41 may also be convex to reflect and enlarge the reference beam 24. The opposed surface 42 of the optical element 40 operates as a light diffuser. Therefore, the shape of the light diffusing surface 42 is immaterial. For example, the surface may be roughened by sand blasting or the like. It should be emphasized that this rear surface does not operate as a lens but solely as a diffuser of the light. Accordingly the diffuser is interposed into the path of the unenlarged light beam. Otherwise the operation of the apparatus of FIG. 3 is the same as that previously described. It has the advantage that it requires a minimum of optical elements, that is, no more than two reflectors 26 and 27, besides the optical element 40.

The embodiment of the invention shown in FIG. 4 is similar to that of FIG. 2 except that the diverging lens 36 in the path of scene beam 25 has been omitted. Thus the original laser beam 23 is split by the beam splitter 35 into the reference beam 24 and the scene beam 25. A diverging lens 38 is interposed into the path of the reference beam and the diffuser 37 is arranged in the path of the scene beam. In this arrangement the diameter of the reference beam is enlarged by the diverging lens 38. On the other hand the effective diameter of the scene beam 25 is enlarged by the provision of the light diffuser 37. The embodiment of FIG. 4 has been found to be particularly practical and efficient in obtaining holograms in reflected light of an object 33.

The embodiment of the invention of FIG. 5 differs from that of FIG. 4 by the provision of an element 45 which serves simultaneously as a beam splitter and light diffuser and hence replaces the elements 35, 37, of FIG. 4. As shown the element 45 may have a plane front surface 46 for reflecting a portion of the laser beam to provide the reference beam 24. The rear surface 47 of the element 45 may again be roughened in any suitable manner to provide a diffusing element.

The principles of the present invention including the provision of a light diffuser in the scene beam for the purpose of averaging amplitude variations and distributing at least a fraction of the scene beam capable of interfering with another fraction of the reference beam by means of a light diffuser may be extended to holograms taken of an object in transmission. Examples of such holographic arrangements are shown in FIGS. 6 and 7.

Turning now to FIG. 6 there is shown a holographic arrangement which is somewhat similar to that of a Mach-Zehnder interferometer. This optical arrangement is such as to equalize the path lengths of the reference beam 24 and the scene beam 25 by a beam splitter 35. A diverging lens 38 is interposed into the path of the reference beam 24, which is subsequently reflected by the reflector 26 onto the hologram 30. The scene beam 25 is also reflected by a reflector 50 onto the recording material 30. Another diverging lens 51 is interposed into the path of the scene beam which is followed by a light diffuser 52. The diffused scene beam then passes through the object 53 to provide a hologram on the recording material 30.

A modification of the holographic arrangement of FIG. 6 is shown in FIG. 7. This is also intended to take a hologram of an object 53 in transmission. This makes use of the optical element 22 which again serves the purpose of a beam splitter and a diverging lens. The laser beam 23 is partly reflected by the concave front surface 41 of the element 22 which also serves the purpose to enlarge the reference beam. That portion of the laser beam passing through the element 40 is diffused by the light diffuser 52. Subsequently the diffused scene beam passes through the object 53 while the reference beam is reflected by the reflector 26 onto the hologram 30.

It should be noted that the diverging lens 51 in the scene beam of the arrangement of FIG. 6, as well as the diverging lens 36 in the path of the scene beam of the arrangement of FIG. 2 are optional and may be omitted. It should also be noted that the arrangement of FIG. 7 also should be such that the optical paths of the reference beam 24 and that of the scene beam 25 should be made as equal as possible.

There has thus been disclosed an improved holographic arrangement which permits the recording of holograms in reflected light without using an expensive solid laser having perfect coherence and operating strictly on a single frequency. This is made possible by utilizing at least one mode selector in the laser beam. Additionally a light diffuser is used preferably in the unenlarged scene beam for scrambling the light, averaging amplitude variations and scattering the light so that interference with the reference beam is possible at each point of the recording material which provides the hologram. In addition to the fact that an inexpensive solid laser may be used with the holographic apparatus of the invention, additional savings may be effected by the use of a particular optical element. This may combine a beam splitter, a diverging lens and a light diffuser in a single, relatively inexpensive element. No additional lenses are needed but only a few light reflectors. As a result of utilizing a solid laser such as a ruby laser without complete mode selection more light power is available and it is possible to obtain holograms with photographic plates or film having lower sensitivity and hence better resolution and affording greater detail.

It has been found that good holograms may be obtained by directing the reference beam and the scene beam on opposite sides of the hologram. In this case the emulsion preferably faces the reference beam. It is also feasible to make volume type holograms where the thickness of the layer of the emulsion is at least ten times the wavelength. Here the hologram operates as a grating and this permits its reconstruction by non-monochromatic or even white light.

What is claimed is:

1. A holographic apparatus having improved spatial coherence and uniform amplitude distribution comprising:
   a. a solid laserable material;
   b. means for pumping said laserable material into an excited stage;
   c. a resonant cavity enclosing said laserable material to cause the generation of a pulse of a substantially monochromatic, coherent light beam;
   d. a mode selector in said cavity for permitting a light pulse of substantially a single frequency to be built up, while providing substantially no transverse mode selection;
   e. optical means for splitting said light beam into a scene beam and a reference beam wherein said optical means for splitting said light beam consists of a diverging lens having a light diffusing surface disposed away from said coherent light beam, whereby the other surface of said diverging lens reflects an enlarged reference beam and said diverging lens passes a diffused scene beam, whereby an object in the path of said scene beam reflects and diffuses said scene beam onto a recording material, said object operating as an additional light diffuser;

f. a recording material disposed in a predetermined plane for recording a hologram of said object wherein the object is positioned to reflect light from said scene beam to the recording material; and g. means for reflecting said reference beam onto said recording material, 2. A holographic apparatus as defined in claim 1 wherein said mode selector is a cell containing a dye selected to normally absorb said light beam and rendered transparent upon said light beam exceeding a predetermined intensity.

3. A holographic apparatus as defined in claim 2 wherein an additional mode selector is provided to define said cavity, said additional mode selector consisting of a resonant reflector.

4. A holographic apparatus as defined in claim 1 wherein said laserable material is a ruby rod.

5. A holographic apparatus having improved spatial coherence matching and uniform amplitude distribution comprising:

a. a laser including a solid laserable material for generating a pulse of a substantially monochromatic, coherent light beam, said laser providing substantially no transverse mode selection;

b. optical means for splitting said light beam into a scene beam and a reference beam; wherein said optical means for splitting said light beam consists of a single diverging lens having a first surface for reflecting and enlarging the light of said coherent light beam to form an enlarged reference beam and having surface for transmitting a portion of said coherent light beam to form a scattered scene beam, whereby an object additionally scatters said scene beam so that at least a portion of the light of said scene beam will be in coherence with at least some of the light of the reference beam at every point of a hologram to be recorded c. a recording material disposed in a predetermined plane for recording a hologram of said object, and wherein the object is positioned to reflect light from said scene beam to the recording material;

d. means for reflecting the reference beam onto said recording material, and e. a light diffuser disposed in the path of said scene beam before it reaches the object reflecting the scene beam, said scene beam having substantially the diameter of the laser beam, whereby said light diffuser scatters the light of said scene beam while said object additionally scatters said scene beam so that at least a portion of the light of said scene beam will be in coherence with at least some of the light of the reference beam at every point of the hologram.

6. A holographic apparatus having improved spatial coherence matching and uniform amplitude distribution comprising:

a. a laser including a solid laserable material for generating a pulse of a substantially monochromatic coherent light beam;

b. a diverging lens having a first concave surface for reflecting said coherent light beam to form an enlarged reference beam, and having a second opposed light diffusing surface for transmitting a portion of said coherent light beam to form a scattered scene beam;

c. a recording material disposed in a predetermined plane for recording a hologram of an object in reflection; and d. optical means including said diverging lens for reflecting said reference and scene beams onto said recording material, whereby a hologram of an object interposed into the path of said scene beam is obtained.

* * * * *